United States Patent [19]

Pakur et al.

[11] 4,039,015

[45] Aug. 2, 1977

[54] BEAD CORE FOR PNEUMATIC TIRES

[75] Inventors: Henryk Pakur, Buckeburg; Reinhard Tiemann, Hemmingen, both of Germany

[73] Assignee: Continental Gummi-Werke Aktiengesellschaft, Hannover, Germany

[21] Appl. No.: 655,124

[22] Filed: Feb. 4, 1976

[30] Foreign Application Priority Data

Feb. 12, 1975    Germany ............................ 2505741

[51] Int. Cl.² ............................................. B60C 15/04
[52] U.S. Cl. .................................................. 152/362 R
[58] Field of Search ............. 152/362 R, 362 CS, 354, 152/361 R; 245/1.5; 59/35, 78, 80, 82–84

[56] References Cited

U.S. PATENT DOCUMENTS

| 708,954 | 9/1902 | Blodgett | 152/358 X |
|---|---|---|---|
| 2,140,491 | 12/1938 | Biedermann | 59/80 |
| 3,106,952 | 10/1963 | Rudder | 152/362 R |

*Primary Examiner*—Drayton E. Hoffman
*Assistant Examiner*—Fred A. Silverberg
*Attorney, Agent, or Firm*—Walter Becker

[57] ABSTRACT

A bead core for pneumatic tires which is composed of a plurality of annular or coil shaped sections of wires, cables or cords. These sections which are of substantially the same size and dimensions interlock each other by each section passing at least once through another section.

6 Claims, 5 Drawing Figures

BEAD CORE FOR PNEUMATIC TIRES

The present invention relates to bead cores for pneumatic tires, which bead cores are made of wires, cables, cords or similar thread-shaped strength carriers wound into a plurality of windings.

The pull-resistant cores embedded in the tire beads which cores in addition to anchoring the reinforcing inserts also have to create a firm fitting of the tires on the respective rims, must for reason of mounting the tire permit radial deformations to a limited extent. These requirements which have to be met under all circumstances are met by making the bead core of a single rigid shaped wire. However, it is generally customary to make the bead core of relatively thin individual wires or cables which in a packet or bundle-like manner are arranged in windings above each other, whereby the required high pull resistance in circumferential direction as well as a sufficient radial deformability is assured. For purposes of fixing the windings relative to each other within the core cross section, a thin rubber mantle is during a preceding treatment step sprayed around the wires, or according to a more recent suggestion, the wires are covered by a linear-like layer of adhesive. When a thrifty employment of an adhesive will do with considerably less quantities of material than the entire surface rubber cover, there still exists the drawback that in each instance expensive operations are necessary.

It is, therefore, an object of the present invention to establish the interconnection of the wire windings prior to the build-up of the core rings, without expensive additional operations and while completely doing without rubberizing the wire windings. These and other objects and advantages of the invention will appear more clearly from the following specification in connection with the accompanying drawings, in which.

The bead core according to the present invention is characterized primarily in that at least a portion of the windings which have substantially equal dimensions are inserted into each other while circumferentially overlapping each other. The term "windings" in this connection comprises not only successive coils of a single strength carrier but also comprises rings closed in themselves. A preferred embodiment of the invention provides that each individual winding passes once through all other windings which in axial projection creates two circumferential overlappings.

The present invention starts with strength carriers in delivered condition with a blank surface and realizes the desired inner connection solely from the mutual interlinking so-to-speak as side effect with the creation of the coils or endless rings. The direct metallic contact of adjacent windings with each other permits, following the installation, limited relative displacements so that a uniform distribution of the entire circumferential force within the bead core is under all circumstances assured for all individual components, and local overstresses of individual windings are excluded.

Figure 1:
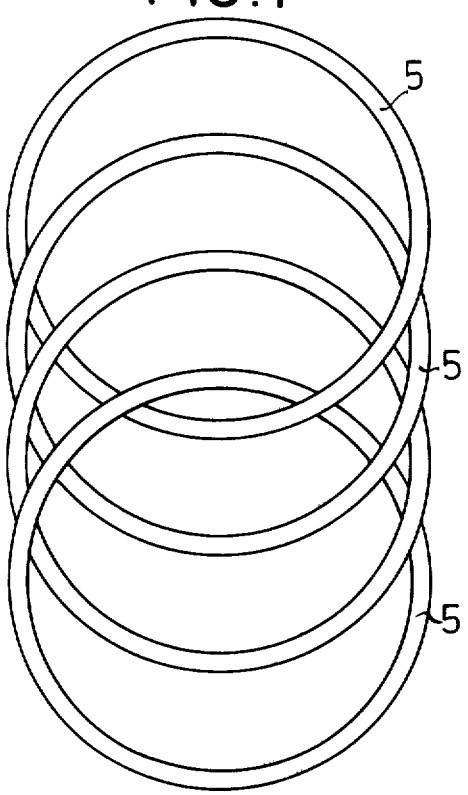
FIG. 1 illustrates a core ring according to the invention which is produced of endless rings and is shown in pulled-apart condition.
Figure 4:
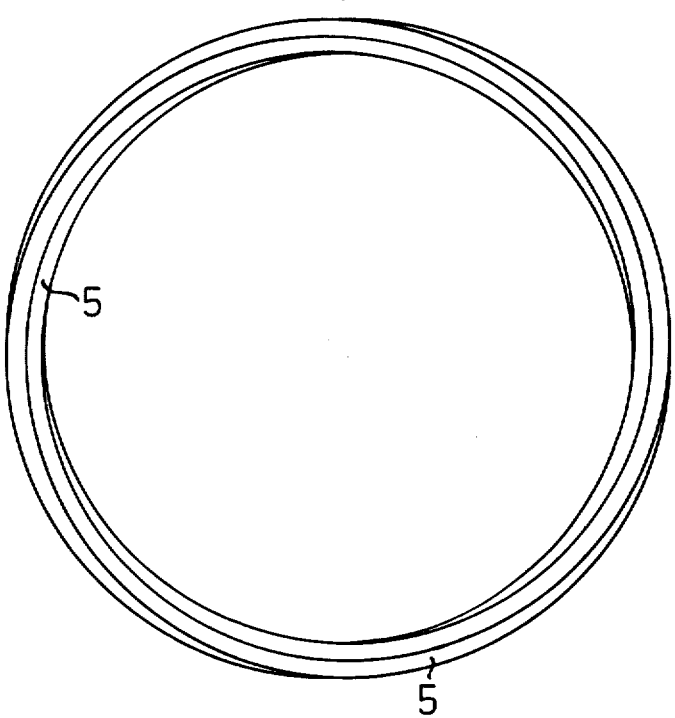
FIG. 4 shows the core ring of FIG. 3 in its compacted final condition.
Figure 3:
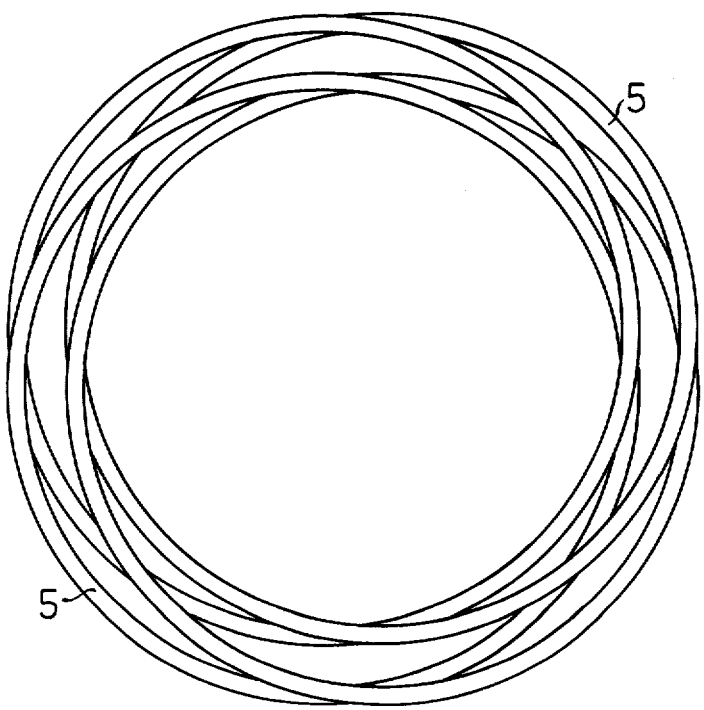
FIG. 3 illustrates the core ring of FIG. 1 in pushed-together condition.
Figure 4A:
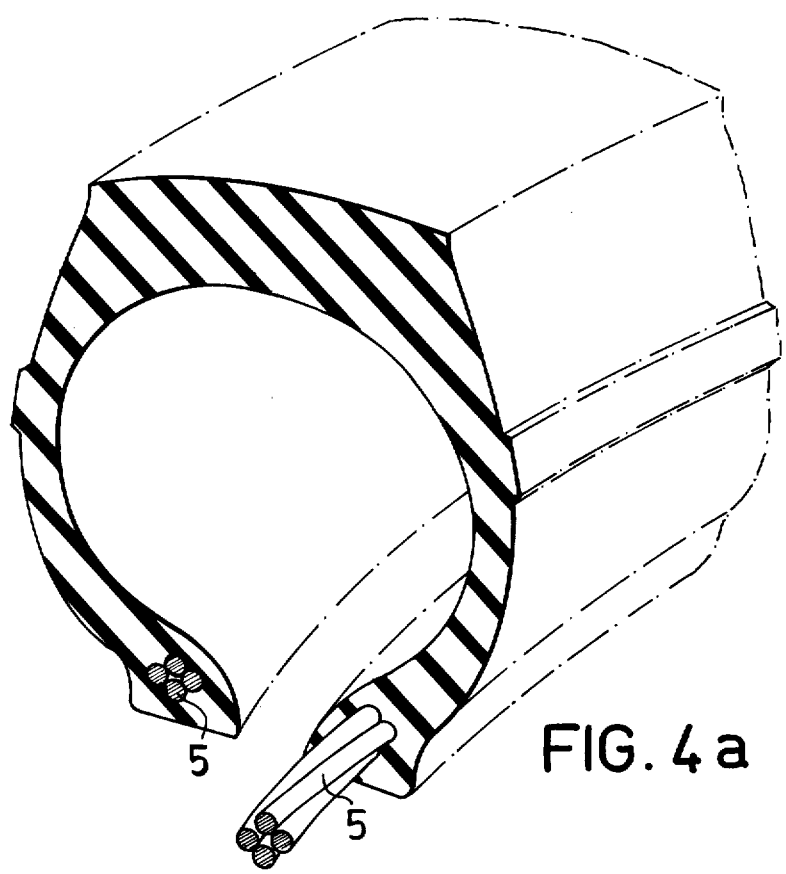
FIG. 4a is a partially sectioned perspective view of a tire having a bead core in accordance with the present invention.

Referring now to the drawings in detail, the core ring illustrated in FIG. 1 is composed of four endless rings 5 which are closed in themselves and may consist for instance of steel wire. These rings are all of the same diameter. The rings 5 are according to FIG. 1 interlinked in such a way that each individual ring while interlocking the other three wires is by soldering or welding of its abutting ends made endless. In loosely compacted condition according to FIG. 3, the rings 5 hang together in a loose but non-disengageable connection and assume their final position by relatively slightly compacting the same as shown in FIG. 4. FIG. 4a illustrates a tire cross section having core rings 5 composed of four coils or windings at a time in this case in the tire beads.

Figure 2:
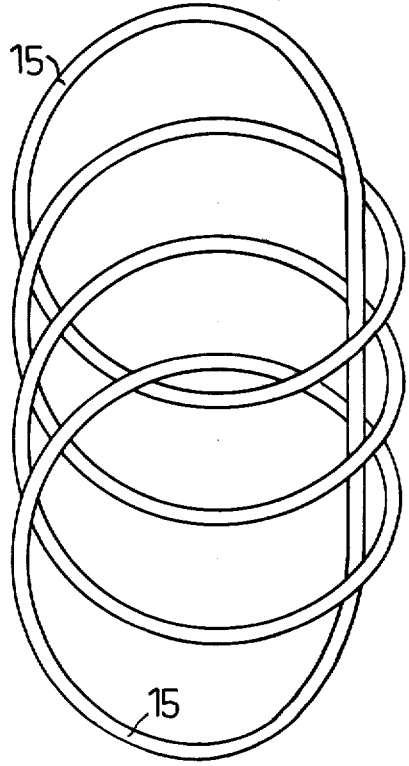
FIG. 2 shows a core ring according to the invention produced from a single wire wound into coils, FIG. 2 showing said core ring in pulled-apart condition.

Instead of employing individual rings, also interlocking windings 15 of a single coiled wire of corresponding length may be employed as it is diagrammatically illustrated in FIG. 2. In such an instance, it is merely necessary to effect a single connection in contrast to the otherwise endless making of each individual wire. Under certain circumstances, even this single connection would not be necessary and the two ends of the wire could be left open. In the compacted condition of use, the coils form core rings similar to the illustrations in FIGS. 3 and 4.

As will be evident from the above, the present invention replaces the heretofore rubberized connection by a mechanical interlocking of the individual wires or cord windings. In this way, not only the material for creating the rubber mantle or the surface layer on the windings is saved, but from the very start any surface treatment as a preparatory step for the composition of the cores will be eliminated. The core rings according to the present invention are immediately after their manufacture and without preparatory steps ready for use. Auxiliary means for fixing the windings with regard to each other as for instance additional bands, clamps or the like are superfluous so that the building up of the bead cores is greatly simplified by the present invention. The distribution of the crossing points over the circumference of the core rings does not have to follow a definite scheme but can be left to chance. The structure of the loose wire connection will be particularly uniform when the finished core rings under the influence of a radial pressure force acting from the inside toward the outside is compacted in its cross section. To this end, relatively low forces suffice as they can be generated by placing the core rings on a conical mandrel. The crossing points will then arrange themselves in conformity with a static distribution.

It is, of course, to be understood that the present invention is, by no means, limited to the specific showing in the drawings, but also comprises any modifications within the scope of the appended claims.

What we claimed is:

1. A tire having a bead core composed of thread-shaped strength carrier means including a plurality of strength carrier sections each of which has an approximate ring configuration wherein any one section interlocks with the remaining sections forming said strength carrier means.

2. A tire having a bead core according to claim 1, in which the sections of said strength carrier means are formed by coils of one and the same strength carrier means.

3. A tire having a bead core according to claim 2, in which said one and the same strength carrier means has its ends connected to each other.

4. A tire having a bead core according to claim 1, in which said sections are formed by individual rings each one ring being closed in itself.

5. A tire having a bead core according to claim 1, in which each section crosses an adjacent section twice and on opposite sides respectively.

6. A tire having a bead core according to claim 1, with which by means of a pressure force acting radially from the inside toward the outside, the ring configuration has its cross section compacted and includes crossing points that are circumferentially distributed and having a penetrating relationship as to each other.

* * * * *